United States Patent
Shacham et al.

(10) Patent No.: US 10,042,777 B2
(45) Date of Patent: Aug. 7, 2018

(54) HARDWARE-BASED TRANSLATION LOOKASIDE BUFFER (TLB) INVALIDATION

(71) Applicant: QUALCOMM Incorporated, San Diego, CA (US)

(72) Inventors: Assaf Shacham, Zichron Yaakov (IL); Shaul Yohai Yifrach, Haifa (IL); Thomas Zeng, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/084,886

(22) Filed: Mar. 30, 2016

(65) Prior Publication Data

US 2017/0286314 A1  Oct. 5, 2017

(51) Int. Cl.
*G06F 12/10* (2016.01)
*G06F 12/1027* (2016.01)
(Continued)

(52) U.S. Cl.
CPC .......... *G06F 12/1027* (2013.01); *G06F 3/064* (2013.01); *G06F 3/0619* (2013.01); *G06F 3/0659* (2013.01); *G06F 3/0673* (2013.01); *G06F 12/1081* (2013.01); *G06F 13/28* (2013.01); *G06F 12/0891* (2013.01); *G06F 2212/1024* (2013.01); *G06F 2212/1028* (2013.01); *G06F 2212/683* (2013.01); *Y02D 10/13* (2018.01)

(58) Field of Classification Search
USPC ........................................................ 711/207
See application file for complete search history.

(56) References Cited

U.S. PATENT DOCUMENTS 7,340,555 B2   3/2008  Ashmore et al.
7,617,377 B2   11/2009  Moertl et al.
(Continued)

OTHER PUBLICATIONS

Author Unknown, "PCI Express® Base Specification Revision 3.0," PCI Express, PCI-SIG, Nov. 10, 2010, 860 pages.
(Continued)

*Primary Examiner* — Ann J Lo
*Assistant Examiner* — Brett P Lohmeier
(74) *Attorney, Agent, or Firm* — Withrow & Terranova, PLLC (57) ABSTRACT

Hardware-based translation lookaside buffer (TLB) invalidation techniques are disclosed. A host system is configured to exchange data with a peripheral component interconnect express PCIE) endpoint (EP). A memory management unit (MMU), which is a hardware element, is included in the host system to provide address translation according to at least one TLB. In one aspect, the MMU is configured to invalidate the at least one TLB in response to receiving at least one TLB invalidation command from the PCIE EP. In another aspect, the PCIE EP is configured to determine that the at least one TLB needs to be invalidated and provide the TLB invalidation command to invalidate the at least one TLB. By implementing hardware-based TLB invalidation in the host system, it is possible to reduce TLB invalidation delay, thus leading to increased data throughput, reduced power consumption, and improved user experience.

20 Claims, 10 Drawing Sheets

(51) Int. Cl.
*G06F 3/06* (2006.01)
*G06F 12/1081* (2016.01)
*G06F 13/28* (2006.01)
*G06F 12/0891* (2016.01)

(56) References Cited

U.S. PATENT DOCUMENTS

| | | | |
|---|---|---|---|
| 8,171,230 B2 | 5/2012 | Freimuth et al. | |
| 8,249,089 B2 | 8/2012 | Saripalli | |
| 9,152,571 B2 | 10/2015 | Kegel et al. | |
| 2006/0190685 A1 | 8/2006 | Arndt et al. | |
| 2008/0091855 A1 | 4/2008 | Moertl et al. | |
| 2009/0024782 A1* | 1/2009 | Elboim | G06F 13/4059 710/313 |
| 2009/0144508 A1* | 6/2009 | Freimuth | G06F 12/1027 711/145 |
| 2013/0283084 A1* | 10/2013 | Lim | G06F 11/1004 713/400 |
| 2013/0346655 A1* | 12/2013 | Glaser | G06F 13/385 710/105 |
| 2014/0281099 A1* | 9/2014 | Avez | G06F 13/30 710/308 |
| 2015/0242319 A1* | 8/2015 | Evans | G06F 12/0833 711/207 |
| 2015/0356036 A1* | 12/2015 | Feehrer | G06F 13/24 710/263 |
| 2016/0378682 A1* | 12/2016 | Sander | G06F 12/1027 711/135 |

OTHER PUBLICATIONS

International Search Report and Written Opinion for PCT/US2017/019383, dated May 10, 2017, 15 pages.
International Preliminary Report on Patentability for PCT/US2017/019383, dated Mar. 16, 2018, 16 pages.

* cited by examiner

HARDWARE-BASED TRANSLATION LOOKASIDE BUFFER (TLB) INVALIDATION

BACKGROUND

I. Field of the Disclosure

The technology of the disclosure relates generally to memory management.

II. Background

Mobile communication devices have become increasingly common in current society. The prevalence of these mobile communication devices is driven in part by the many functions that are now enabled on such devices. Increased processing capabilities in such devices means that mobile communication devices have evolved from being purely communication tools into sophisticated mobile multimedia centers, thus enabling enhanced user experiences.

Data processing elements (e.g., application processors, graphic processors, etc.) in mobile communication devices often store a variety of system and application-specific data in a system memory, such as dynamic random access memory (DRAM). Applications running in a mobile communication device rely on application processors to access the system memory. For example, when an application needs to read data from the system memory for transmission through a high-speed input/output (I/O) circuit, one or more application processors may be fully occupied for the entire duration of the read operation. Likewise, when the application needs to write data received from the high-speed I/O circuit to the system memory, the one or more application processors may be fully occupied for the entire duration of the write operation. As a result, the one or more application processors may become unavailable to perform other tasks in the mobile communication device, thus leading to compromised performance and user experience.

Direct memory access (DMA) technology, which allows a hardware element (e.g., the high-speed I/O circuit) to access the system memory independently of the application processor, is widely employed in mobile communication devices to help mitigate the processing bottleneck. With DMA, when the application needs to read a block of data from the system memory for transmission through the high-speed I/O circuit, the application processor initiates the block data transfer between the system memory and the high-speed I/O circuit and then switches to serving other tasks in the mobile communication device. A DMA management element, such as a memory management unit (MMU), in the mobile communication device then carries out the block data transfer on behalf of the application processor and generates an interrupt to notify the application processor only when the block data transfer is completed. Commercial needs dictate continued improvement in performance, and a more efficient DMA management unit may assist in improving overall performance and user experience.

SUMMARY OF THE DISCLOSURE

Aspects disclosed in the detailed description include hardware-based translation lookaside buffer (TLB) invalidation techniques. A host system is configured to exchange data with a peripheral component interconnect express (PCIE) endpoint (EP) (e.g., a high-speed WI-FI chipset) based on, for example, direct memory access (DMA). A memory management unit (MMU), which is a hardware element, is included in the host system to provide address translation according to at least one TLB. In one aspect, the MMU is configured to invalidate the TLB in response to receiving at least one TLB invalidation command from the PCIE EP. In another aspect, the PCIE EP is configured to determine that the TLB needs to be invalidated and provide the TLB invalidation command to invalidate the TLB. By implementing hardware-based TLB invalidation in the host system, it is possible to reduce TLB invalidation delay, thus leading to increased data throughput, reduced power consumption, and improved user experience.

In this regard, in one aspect, a host system is provided. The host system includes at least one processor coupled to a system bus. The host system also includes a memory controller coupled to the system bus and configured to control a memory. The host system also includes a MMU including at least one TLB. The MMU is coupled to the system bus and configured to invalidate the at least one TLB in response to receiving at least one TLB invalidation command from a PCIE EP.

In another aspect, a method for invalidating at least one TLB in a host system is provided. The method includes receiving at least one TLB invalidation command from a PCIE EP. The method also includes invalidating at least one TLB in response to receiving the at least one TLB invalidation command from the PCIE EP.

In another aspect, a PCIE EP is provided. The PCIE EP includes a host interface controller (HIC) communicatively coupled to a host system. The HIC is configured to determine that at least one TLB in the host system needs to be invalidated. The HIC is also configured to provide at least one TLB invalidation command to the host system to invalidate the at least one TLB.

In another aspect, a method for invalidating at least one TLB in a host system is provided. The method includes determining at least one TLB in the host system that needs to be invalidated. The method also includes providing at least one TLB invalidation command to the host system to invalidate the at least one TLB.

DETAILED DESCRIPTION

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include hardware-based translation lookaside buffer (TLB) invalidation techniques. A host system is configured to exchange data with a peripheral component interconnect express (PCIE) endpoint (EP) (e.g., a high-speed WI-FI chipset) based on, for example, direct memory access (DMA). A memory management unit (MMU), which is a hardware element, is included in the host system to provide address translation according to at least one TLB. In one aspect, the MMU is configured to invalidate the TLB in response to receiving at least one TLB invalidation command from the PCIE EP. In another aspect, the PCIE EP is configured to determine that the TLB needs to be invalidated and provide the TLB invalidation command to invalidate the TLB. By implementing hardware-based TLB invalidation in the host system, it is possible to reduce TLB invalidation delay, thus leading to increased data throughput, reduced power consumption, and improved user experience.

Figure 1:
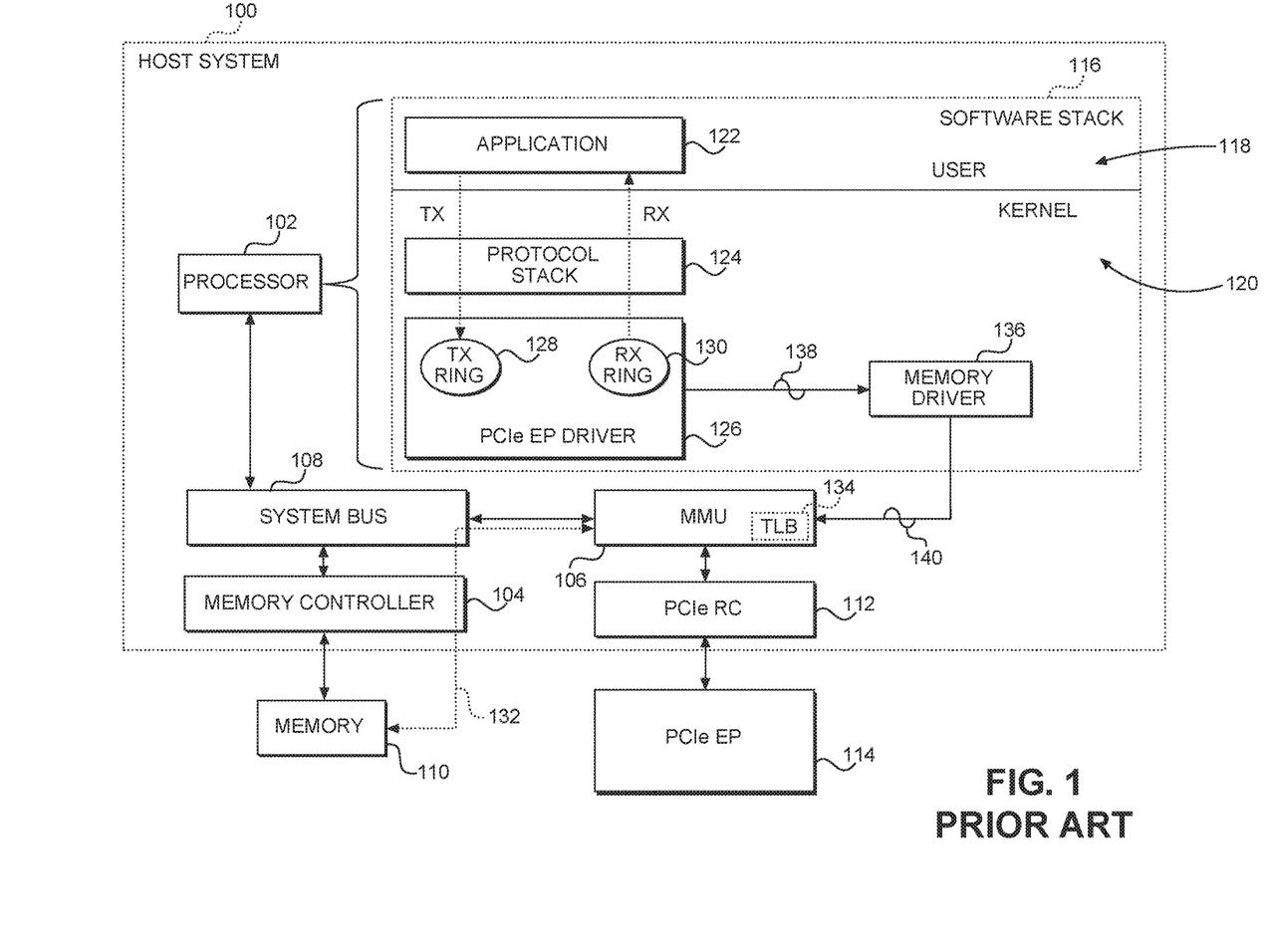
FIG. 1 is a schematic diagram of an exemplary conventional host system implementing a software-based translation lookaside buffer (TLB) invalidation mechanism.

Before discussing exemplary aspects of hardware-based TLB invalidation that include specific aspects of the present disclosure, a brief overview of a conventional host system implementing software-based TLB invalidation is first provided in FIG. 1. A brief overview of signal flows involved in transmitting and receiving data in the conventional host system is then discussed with reference to FIGS. 2 and 3, respectively. The discussion of specific exemplary aspects of hardware-based TLB invalidation starts with reference to FIG. 4.

In this regard, FIG. 1 is a schematic diagram of an exemplary conventional host system 100 implementing a software-based TLB invalidation mechanism. The conventional host system 100 includes at least one processor 102 (hereinafter processor 102), a memory controller 104, and a MMU 106. The processor 102, the memory controller 104, and the MMU 106 are coupled to a system bus 108. The memory controller 104 is configured to control a memory 110, such as a dynamic random access memory (DRAM) or a double data rate (DDR) DRAM, for example. The conventional host system 100 also includes a PCIE root complex (RC) 112 communicatively coupled to the system bus 108 via the MMU 106. The PCIE RC 112 is configured to control at least one PCIE EP 114 (hereinafter PCIE EP 114). Communication between the PCIE RC 112 and the PCIE EP 114 is based on transport layer packets (TLPs) (not shown). Each TLP includes address information enabling the PCIE RC 112 to route the TLP correctly to the PCIE EP 114. In this regard, the PCIE RC 112 is analogous to a router of an internet-protocol (IP) network, and the TLPs are analogous to IP packets communicated in the IP network.

The conventional host system 100 includes a software stack 116, which may reside in the memory 110 and be accessible via the memory controller 104, including software executable that can be executed by the processor 102. In a non-limiting example, the software stack 116 may be divided into a user layer 118 and a kernel layer 120. The user layer 118 may include an application 122 that can interact with end users (not shown) via graphical user interfaces (GUIs) (not shown). The kernel layer 120 may include one or more protocol stacks 124, such as a transport control protocol (TCP)/IP (TCP/IP) protocol stack. The kernel layer 120 may also include a PCIE EP driver 126 to enable communications with the PCIE EP 114. The PCIE EP driver 126 may include a transmit (TX) ring 128 and a receive (RX) ring 130 for storing transmitting and received packets (not shown), respectively.

With continuing reference to FIG. 1, when the application 122 executing on the processor 102 needs to write a block of data (not shown) to the memory 110, the processor 102 provides the block of data to the memory controller 104 via the system bus 108. The memory controller 104 assigns physical addresses and virtual addresses to the block of data. The physical addresses are addresses of actual storage units (e.g., memory cells) in the memory 110, while the virtual addresses are logical addresses to be referenced by the processor 102 and the application 122. When the application 122 needs to read the block of data from the memory 110, the processor 102 provides the virtual addresses to the memory controller 104. The memory controller 104 translates the virtual addresses into the corresponding physical addresses and retrieves the block of data from the memory 110. In this regard, the application 122 and the processor 102 are only aware of the virtual addresses of the block of data.

Sometimes the application 122 may need to read and output one or more data blocks from the memory 110 to the PCIE EP 114 (hereinafter referred to as a data TX operation), or to store one or more data blocks received from the PCIE EP 114 in the memory 110 (hereinafter referred to as a data RX operation). In this regard, the processor 102 may establish a DMA pipe 132 to enable high-speed data exchange between the MMU 106 and the memory 110. The processor 102 then switches to handle other processing tasks associated with the software stack 116. The MMU 106, in turn, controls the DMA pipe 132 on behalf of the processor 102. During the data TX operation, the MMU 106 retrieves the one or more data blocks via the memory controller 104 using virtual addresses assigned to the one or more data blocks. The MMU 106 then converts the virtual addresses of the one or more data blocks into DMA addresses before providing the one or more data blocks to the PCIE EP 114 via the PCIE RC 112. During the data RX operation, the MMU 106 converts DMA addresses of one or more received data blocks into corresponding virtual addresses before providing the one or more received data blocks to the memory controller 104.

The MMU 106 includes at least one TLB 134 (hereinafter TLB 134) that may be provided inside the MMU 106, as a non-limiting example. The TLB 134 may include one or more address mapping entries (not shown) to facilitate translations from the virtual addresses to the DMA addresses, and vice versa. In this regard, during the data TX operation, after a data block is output to the PCIE EP 114, the MMU 106 needs to invalidate a corresponding address mapping entry in the TLB 134 to make room for a next data block. Likewise, during the data RX operation, after a received data block is provided to the memory controller 104, the MMU 106 needs to invalidate another corresponding address mapping entry in the TLB 134 to make room for the next received data block.

In the conventional host system 100, a memory driver 136 in the software stack 116 is configured to invalidate the TLB 134 in response to receiving a DMA unmap instruction 138 from the PCIE EP driver 126. In a non-limiting example, the DMA unmap instruction 138 may indicate a specific address mapping entry in the TLB 134 to be invalidated. The memory driver 136 in turn provides a TLB invalidation command 140 to the MMU 106 to invalidate the TLB 134 as instructed in the DMA unmap instruction 138. To further illustrate TLB invalidation signal flows during the data TX operation and the data RX operation, FIGS. 2 and 3 and provided and discussed next.

Figure 2:
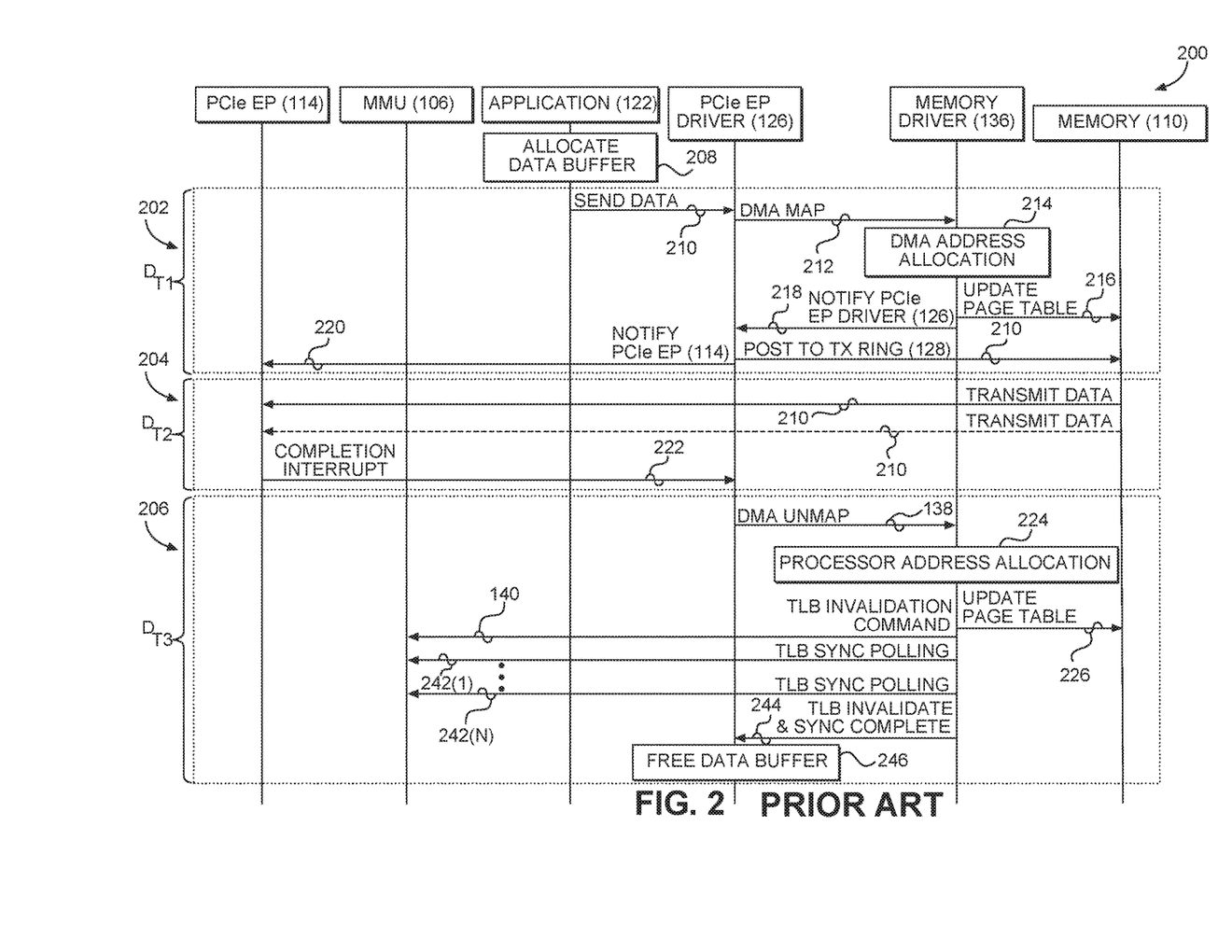
FIG. 2 is a transmit (TX) operation signal flow diagram providing an exemplary illustration of the conventional software-based TLB invalidation mechanism of FIG. 1 performed during a data TX operation.

In this regard, FIG. 2 is a TX operation signal flow diagram 200 providing an exemplary illustration of the software-based TLB invalidation mechanism of FIG. 1 performed during the data TX operation. Common elements between FIGS. 1 and 2 are shown therein with common element numbers and will not be re-described herein.

With reference to FIG. 2, the data TX operation includes a data preparation stage 202, a data transmission stage 204, and a TLB invalidation stage 206. During the data preparation stage 202, the application 122 first requests that a data buffer be allocated (block 208). The application 122 then provides data in the form of one or more data blocks 210 to the PCIE EP driver 126. The PCIE EP driver 126 sends a DMA map instruction 212 to request the memory driver 136 to allocate DMA addresses for the one or more data blocks 210. The memory driver 136 in turn performs DMA address allocation (block 214). The memory driver 136 then sends a page table update 216 to update a page table in the memory 110. Subsequently, the memory driver 136 provides a PCIE driver notification 218 to the PCIE EP driver 126. In response, the PCIE EP driver 126 posts the one or more data blocks 210 to the TX ring 128 (not shown) residing in the memory 110. The data preparation stage 202 concludes with a notify PCIE EP signal 220, which indicates a start of data transmission to the PCIE EP 114. The data preparation stage 202 takes a data preparation duration $D_{T1}$ to complete.

During the data transmission stage 204, the one or more data blocks 210 are sent from the TX ring 128 to the PCIE EP 114 via the DMA pipe 132 (not shown). In a non-limiting example, the TX ring 128 may provide the one or more data blocks 210 to the PCIE EP 114 in parallel (e.g., over multiple data lines in the DMA pipe 132), as illustrated in FIG. 2. As previously discussed, the MMU 106 performs virtual address to DMA address translation using the one or more address mapping entries in the TLB 134 (not shown). The data transmission stage 204 is concluded by a completion interrupt 222 when the PCIE EP 114 receives the one or more data blocks 210. The data transmission stage 204 takes a data transmission duration $D_{T2}$ to complete.

The TLB invalidation stage 206 begins when the PCIE EP driver 126 receives the completion interrupt 222 from the PCIE EP 114. In response to receiving the completion interrupt 222, the PCIE EP driver 126 provides the DMA unmap instruction 138 to the memory driver 136. The memory driver 136 can then perform processor address allocation so as to return control to the processor 102 (not shown) (block 224). The memory driver 136 then sends a page table update 226 to the memory 110. Subsequently, the memory driver 136 provides the TLB invalidation command 140 to the MMU 106 to invalidate the TLB 134 as instructed in the DMA unmap instruction 138. In the meantime, the memory driver 136 awaits TLB invalidation to complete by sending one or more TLB SYNC polling commands 242(1)-242(N). When the TLB invalidation is completed, the memory driver 136 provides a TLB invalidate and SYNC complete indication 244 to the PCIE EP driver 126. The PCIE EP driver 126 in turn frees the data buffer allocated at the beginning of the data preparation stage 202 (block 246). The TLB invalidation stage 206 takes a TLB invalidation duration $D_{T3}$ to complete.

With continuing reference to FIG. 2, the data preparation stage 202, the data transmission stage 204, and the TLB invalidation stage 206 are typically performed in parallel. In a non-limiting example, the application 122 transmits three data blocks (data block 1, data block 2, and data block 3) sequentially to the PCIE EP 114 during the data TX operation. Data block 1 first enters the data preparation stage 202. When data block 1 enters the data transmission stage 204, data block 2 enters the data preparation stage 202. When transmission of the data block 1 is completed, data block 2 enters the data transmission stage 204, and data block 3 enters the data preparation stage 202. Concurrently, the TLB invalidation stage 206 begins to free data mapping entries associated with the data block 1 in the TLB 134.

In a non-limiting example, the PCIE RC 112 (not shown) may support a data rate of three thousand four hundred megabits per second (3400 Mbps or 3.4 Gbps). If each of the three data blocks is one thousand five hundred thirty-six bytes (1536 B) in size, the PCIE RC 112 will take approximately three point six microseconds (3.6 μs) to transmit each of the three data blocks. In other words, the data transmission duration $D_{T2}$ is 3.6 μs. In this regard, to maintain an uninterrupted data flow in the DMA pipe 132, it is necessary for the data preparation duration $D_{T1}$ and the TLB invalidation duration $D_{T3}$ to be less than or equal to 3.6 μs ($D_{T1} \le D_{T2}$, and $D_{T3} \le D_{T2}$).

Figure 3:
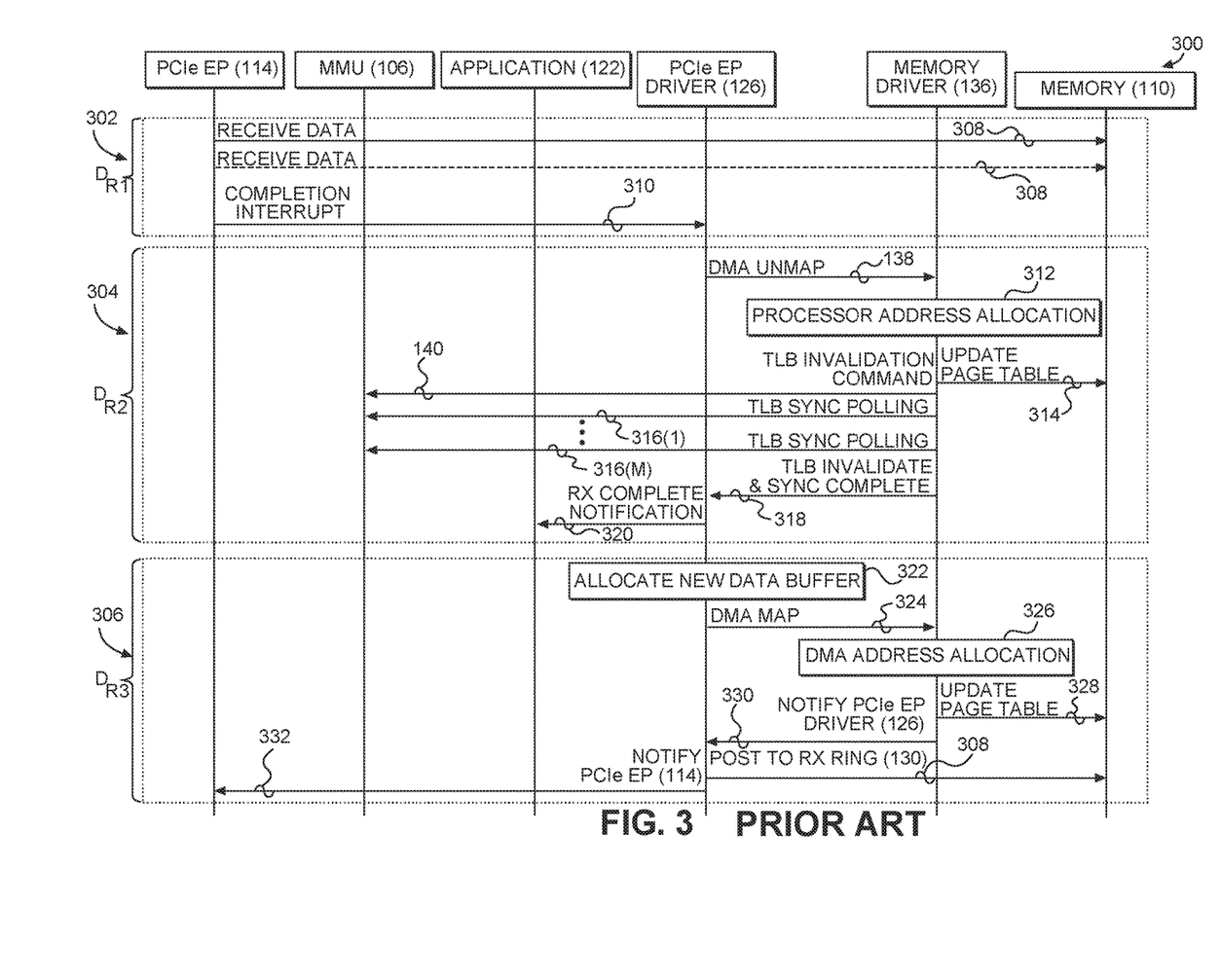
FIG. 3 is a receive (RX) operation signal flow diagram providing an exemplary illustration of the conventional software-based TLB invalidation mechanism of FIG. 1 performed during a data RX operation.

FIG. 3 is an RX operation signal flow diagram 300 providing an exemplary illustration of the software-based TLB invalidation mechanism of FIG. 1 performed during the data RX operation. Common elements between FIGS. 1 and 3 are shown therein with common element numbers and will not be re-described herein.

With reference to FIG. 3, the data RX operation includes a data receive stage 302, a TLB invalidation stage 304, and an RX preparation stage 306. In the data receive stage 302, the PCIE EP 114 provides one or more data blocks 308 to the memory 110 via the DMA pipe 132 (not shown). In a non-limiting example, the PCIE EP 114 may provide the one or more data blocks 308 to the memory 110 in parallel (e.g., over multiple data lines in the DMA pipe 132), as illustrated in FIG. 3. The data receive stage 302 is concluded by a completion interrupt 310 when the PCIE EP 114 completes transmitting the one or more data blocks 308. The data receive stage 302 takes a data receive duration $D_{R1}$ to complete.

The TLB invalidation stage 304 begins when the PCIE EP driver 126 receives the completion interrupt 310 from the PCIE EP 114. The PCIE EP driver 126 provides the DMA unmap instruction 138 to the memory driver 136 to invalidate the TLB 134 (not shown). The memory driver 136 then performs processor address allocation so as to return control to the processor 102 (not shown) (block 312). The memory driver 136 then sends a page table update 314. Subsequently, the memory driver 136 provides the TLB invalidation command 140 to the MMU 106 to invalidate the TLB 134 as instructed in the DMA unmap instruction 138. In the meantime, the memory driver 136 awaits TLB invalidation to complete by sending one or more TLB SYNC polling commands 316(1)-316(M). When the TLB invalidation is completed, the memory driver 136 provides a TLB invalidate and SYNC complete indication 318 to the PCIE EP driver 126. The PCIE EP driver 126 provides an RX complete notification 320 to notify the application 122. The TLB invalidation stage 206 takes a TLB invalidation duration $D_{R2}$ to complete.

The RX preparation stage 306 begins when the PCIE EP driver 126 receives the TLB invalidation and SYNC complete indication 318. The PCIE EP driver 126 allocates a new data buffer (not shown) for the TLB 134 that is invalidated during the TLB invalidation stage 304 (block 322). The PCIE EP driver 126 sends a DMA map instruction 324 to request the memory driver 136 to allocate DMA addresses for the one or more data blocks 308. The memory driver 136 in turn performs DMA address allocation (block 326). The memory driver 136 then sends a page table update 328 to update the page table in the memory 110. Subsequently, the memory driver 136 provides a PCIE driver notification 330 to the PCIE EP driver 126. In response, the PCIE EP driver 126 posts the one or more data blocks 308 to the RX ring 130 (not shown) residing in the memory 110. The data preparation stage 202 concludes with a notify PCIE EP signal 332. The RX preparation stage 306 takes a data preparation duration $D_{R3}$ to complete.

Similar to the TX operation signal flow diagram 200 of FIG. 2, the TLB invalidation duration $D_{R2}$ and the data preparation duration $D_{R3}$ of the data RX operation need to be less than or equal to the data receive duration $D_{R1}$ ($D_{R2} \leq D_{R1}$ and $D_{R3} \leq D_{R1}$) to maintain an uninterrupted data flow in the DMA pipe 132. However, as TLB invalidations in the TX operation signal flow diagram 200 of FIG. 2 and the RX operation signal flow diagram 300 of FIG. 3 are carried out by the memory driver 136, it may be possible that the TLB invalidation durations $D_{T3}$ or $D_{R2}$ may actually exceed the data transmission duration $D_{T2}$ of FIG. 2 or the data receive duration $D_{R1}$ of FIG. 3, respectively, thus interrupting the data flow in the DMA pipe 132. Hence, it is desirable to minimize TLB invalidation latency associated with the memory driver 136 to provide uninterrupted data flow in the DMA pipe 132.

Figure 4:
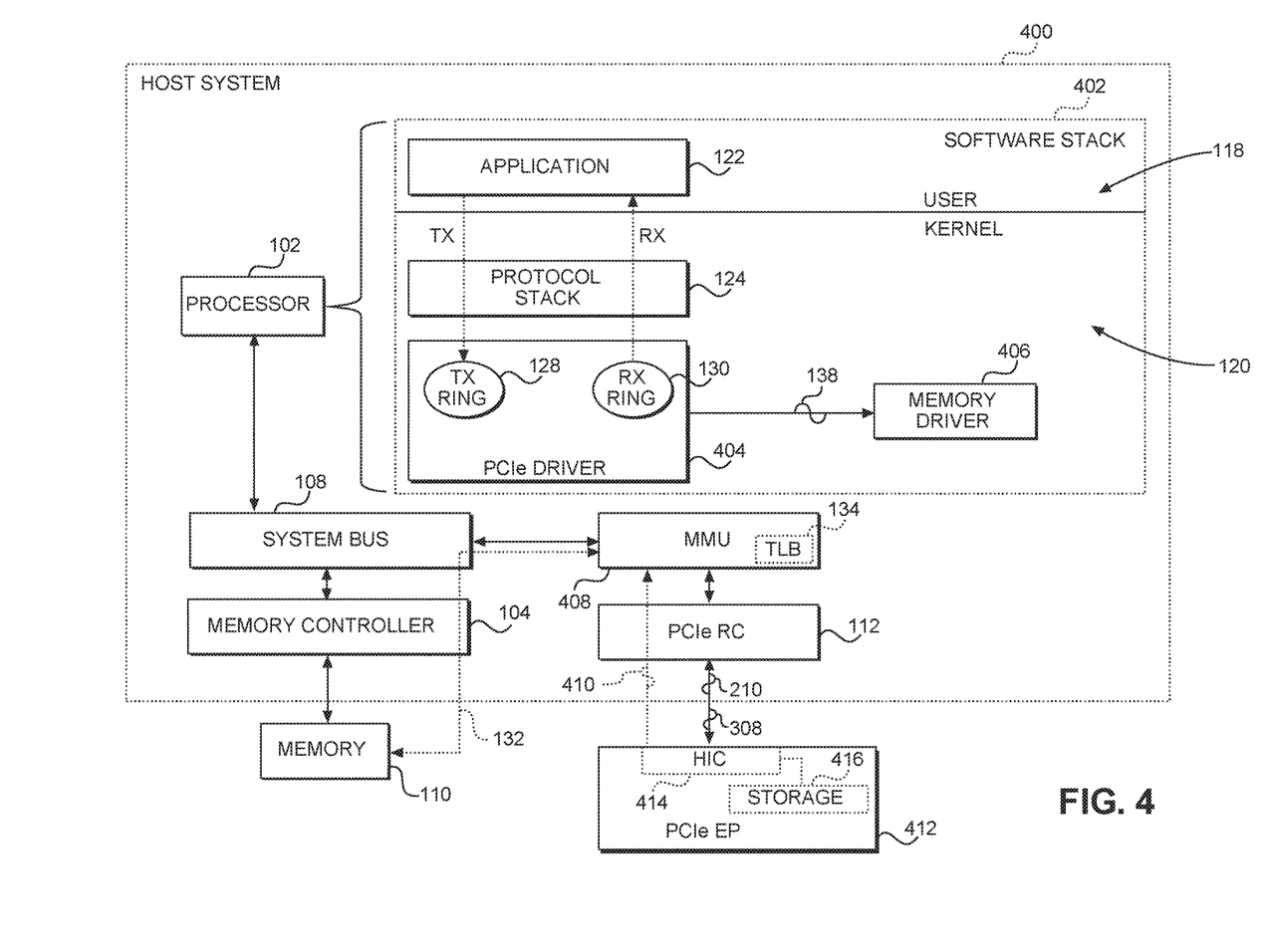
FIG. 4 is a schematic diagram of an exemplary host system implementing a hardware-based TLB invalidation mechanism for reducing TLB invalidation latency associated with the software-based TLB invalidation mechanism of FIG. 1.

In this regard, FIG. 4 is a schematic diagram of an exemplary host system 400 implementing a hardware-based TLB invalidation mechanism for reducing TLB invalidation latency associated with the software-based TLB invalidation mechanism of FIG. 1. The host system 400 is configured to reuse many of the elements in the conventional host system 100 to provide backward compatibility. As such, common elements between FIGS. 1-4 are shown therein with common element numbers and will not be re-described herein.

With reference to FIG. 4, the host system 400 includes a software stack 402, which may reside in the memory 110 and be accessible via the memory controller 104, including software executable that can be executed by the processor 102. The software stack 402 includes a PCIE EP driver 404 and a memory driver 406. Unlike the PCIE EP driver 126 and the memory driver 136 in FIG. 1, the memory driver 406 is configured not to generate the TLB invalidation command 140 in response to receiving the DMA unmap instruction 138 from the PCIE EP driver 404. In this regard, in contrast to the software-based TLB invalidation mechanism employed in the conventional host system 100 of FIG. 1, the host system 400 employs the hardware-based TLB invalidation mechanism that does not involve the memory driver 406. As a result, it is possible to reduce TLB invalidation latency associated with the software-based TLB invalidation mechanism employed in the conventional host system 100.

The host system 400 includes a MMU 408 configured to receive at least one TLB invalidation command 410 (hereinafter TLB invalidation command 410) from a PCIE EP 412 via the PCIE RC 112. The MMU 408 is further configured to invalidate the TLB 134 in response to receiving the TLB invalidation command 410. . As is discussed later in FIGS. 8 and 9, the hardware-based TLB invalidation mechanism performed at the MMU 408 helps to eliminate the TLB invalidation command 140 of FIGS. 2 and 3. Further, the hardware-based TLB invalidation mechanism performed at the MMU 408 also helps to eliminate the one or more TLB SYNC polling commands 242(1)-242(N) in the TX operation signal flow diagram 200 in p FIG. 2 and the one or more TLB SYNC polling commands 316(1)-316(M) the RX operation signal flow diagram 300 in FIG. 3. By employing the hardware-based TLB invalidation mechanism in the host system 400, it is possible to reduce TLB invalidation latency associated with the software-based TLB invalidation mechanism employed in the conventional host system 100, thus ensuring uninterrupted data flow in the DMA pipe 132.

With continuing reference to FIG. 4, the PCIE EP 412 includes a host interface controller (HIC) 414 and storage media 416. The HIC 414 is communicatively coupled to the host system 400 via the PCIE RC 112. The PCIE EP 412 receives the one or more data blocks 210 from the host system 400 and transmits the one or more data blocks 308 to the host system 400. In a non-limiting example, the PCIE EP 412 may be a WI-FI communication integrated circuit (IC) configured to operate according to Institute of Electrical and Electronics Engineers (IEEE) 802.11ad or IEEE 802.11ac standards. In another non-limiting example, the HIC 414 may determine that the TLB 134 needs to be invalidated based on detected data patterns of the one or more data blocks 210 and/or the one or more data blocks 308. For example, the PCIE EP 412 may exchange data with the host system 400 according to a constant bit rate (CBR) pattern, which involves communicating a known amount of data during a predefined communication period. In this regard, the HIC 414 may be able to determine that the TLB 134 needs to be invalidated after exchanging the known amount of data during the predefined communication period.

The PCIE EP 412 receives the one or more data blocks 210 and transmits the one or more data blocks 308 using PCIE transport layer packets (TLPs). In a non-limiting example, the HIC 414 may provide the TLB invalidation command 410 to the PCIE RC 112 in the TLPs. In this regard, FIG. 5 is a schematic diagram of an exemplary PCIE TLP 500 that may be configured to convey the TLB invalidation command 410 (not shown) to the host system 400 (not shown) of FIG. 4.

Figure 5:
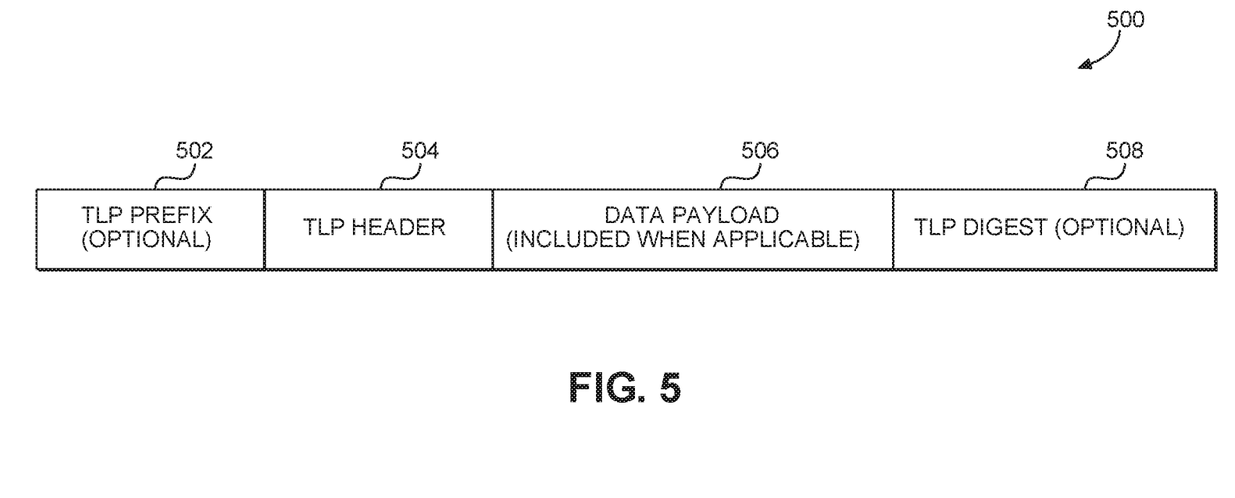
FIG. 5 is a schematic diagram of an exemplary peripheral component interconnect express (PCIE) transport layer packet (TLP) that may be configured to convey at least one TLB invalidation command to the host system of FIG. 4.

With reference to FIG. 5, the PCIE TLP 500, as defined in PCIE base specification revision 3.0 published by the PCI special interest group (PCI-SIG) on Nov. 10, 2010, includes a TLP prefix 502, a TLP header 504, a data payload 506, and a TLP digest 508. The data payload 506 may convey the one or more data blocks 210 (not shown) and/or the one or more data blocks 308 (not shown) of FIG. 4. The TLP header 504 may include information (e.g., address, type, etc.) identifying the PCIE TLP 500. The TLP prefix 502 may include vendor-specific information. In a non-limiting example, it may be possible to communicate the TLB invalidation command 410 in the TLP prefix 502 or the TLP header 504.

Figure 6:
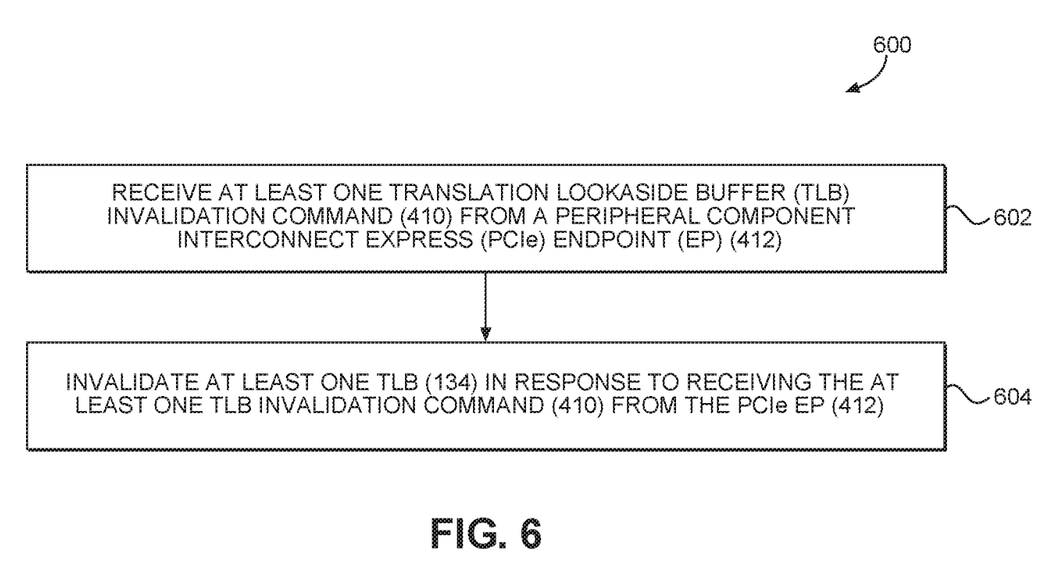
FIG. 6 is a flowchart of an exemplary TLB invalidation process performed by the host system of FIG. 4 to invalidate the at least one TLB.

The host system 400 of FIG. 4 may be configured to perform hardware-based TLB invalidation according to a host side process. In this regard, FIG. 6 is a flowchart of an exemplary TLB invalidation process 600 performed by the host system 400 of FIG. 4 to invalidate the TLB 134. According to the TLB invalidation process 600, the host system 400 receives the TLB invalidation command 410 from the PCIE EP 412 (block 602). In a non-limiting example, the PCIE EP 412 may include the TLB invalidation command 410 in the TLP prefix 502 or the TLP header 504 in the PCIE TLP 500 of FIG. 5. The PCIE EP 412 may provide the PCIE TLP 500 containing the TLB invalidation command 410 to the PCIE RC 112 in the host system 400. Subsequently, the host system 400 invalidates the TLB 134 in response to receiving the TLB invalidation command 410 from the PCIE EP 412 (block 604).

Figure 7:
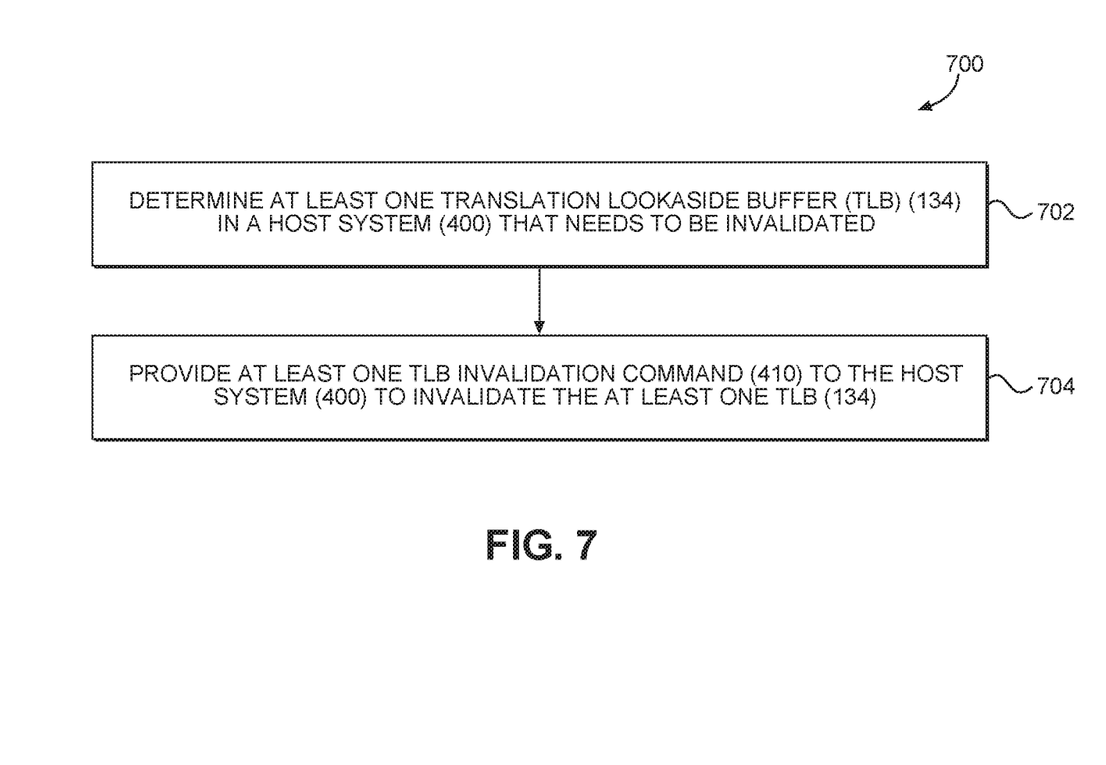
FIG. 7 is a flowchart of an exemplary TLB invalidation notification process performed by PCIE endpoint (EP) to provide at least one TLB invalidation command to the host system of FIG. 4.

The PCIE EP 412 of FIG. 4 may be configured to provide the TLB invalidation command 410 based on a PCIE EP side process. In this regard, FIG. 7 is a flowchart of an exemplary TLB invalidation notification process 700 performed by the PCIE EP 412 of FIG. 4 to provide the TLB invalidation command 410. According to the TLB invalidation notification process 700, the PCIE EP 412 determines that the TLB 134 in the host system 400 needs to be invalidated (block 702). Subsequently, the PCIE EP 412 provides the TLB invalidation command 410 to the host system 400 to invalidate the TLB 134 (block 704). In a non-limiting example, the PCIE EP 412 may include the TLB invalidation command 410 in the TLP prefix 502 or the TLP header 504 in the PCIE TLP 500 of FIG. 5. The PCIE EP 412 may provide the PCIE TLP 500 containing the TLB invalidation command 410 to the PCIE RC 112 in the host system 400.

Figure 8:
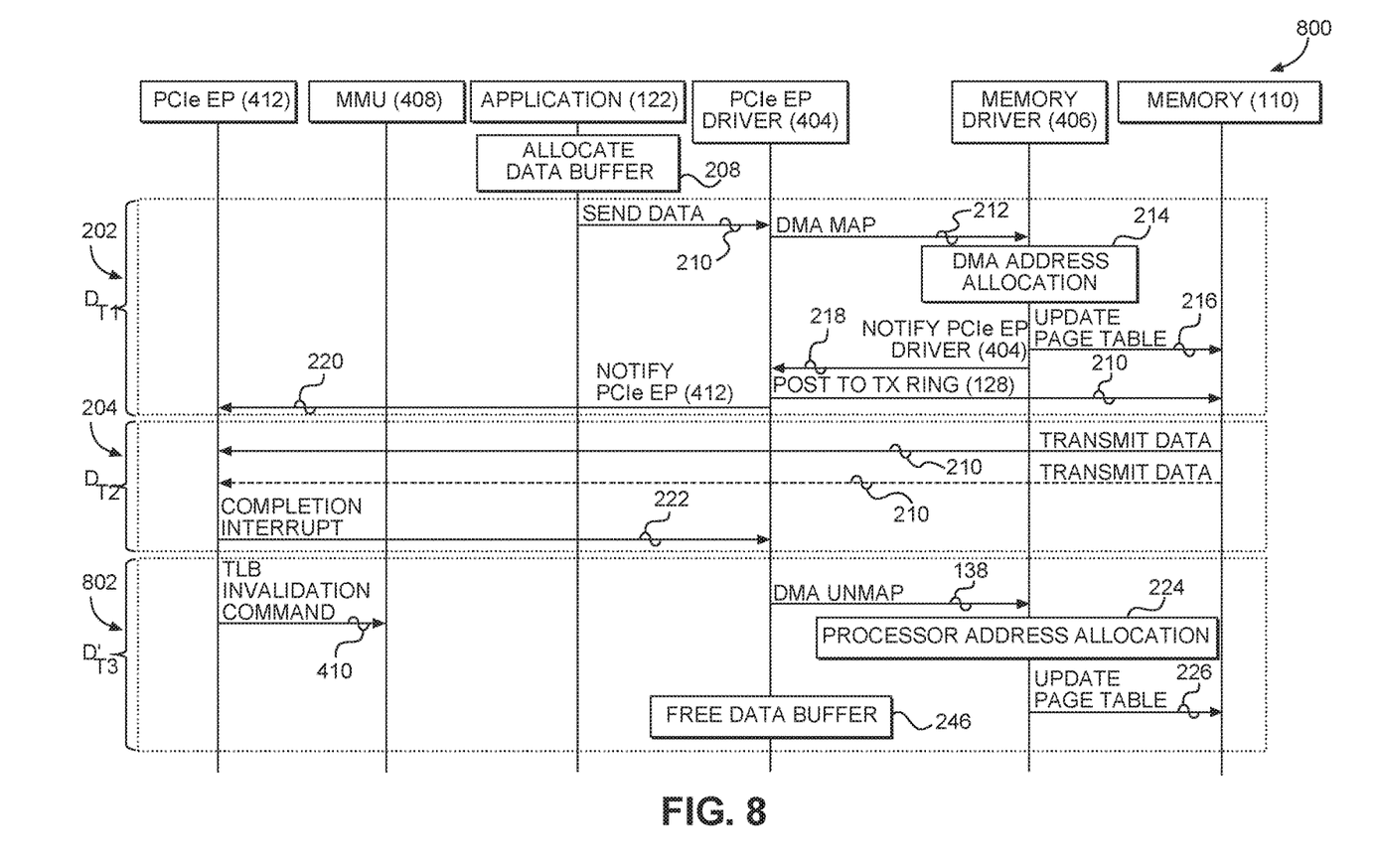
FIG. 8 is a TX operation signal flow diagram providing an exemplary illustration of the hardware-based TLB invalidation mechanism of FIG. 4 performed during a data TX operation.

As previously discussed in FIG. 4, the hardware-based TLB invalidation mechanism performed at the MMU 408 helps to eliminate the TLB invalidation command 140 and the one or more TLB SYNC polling commands 242(1)-242(N) in the TX operation signal flow diagram 200 in FIG. 2. In this regard, FIG. 8 is a TX operation signal flow diagram 800 providing an exemplary illustration of the hardware-based TLB invalidation mechanism of FIG. 4 performed during a data TX operation. Common elements between FIGS. 2 and 8 are shown therein with common element numbers and will not be re-described herein.

With reference to FIG. 8, during a TLB invalidation stage 802, the MMU 408 invalidates the TLB 134 in response to receiving the TLB invalidation command 410 from the PCIE EP 412. As such, the TLB invalidation command 140 and the one or more TLB SYNC polling commands 242(1)-242(N) of FIG. 2 can be eliminated. As a result, the TLB invalidation stage 802 corresponds to TLB invalidation duration $D'_{T3}$ that may be reduced relative to the TLB invalidation duration $D_{T3}$ of FIG. 2, thus ensuring that $D'_{T3} \leq D_{T2}$.

Figure 9:
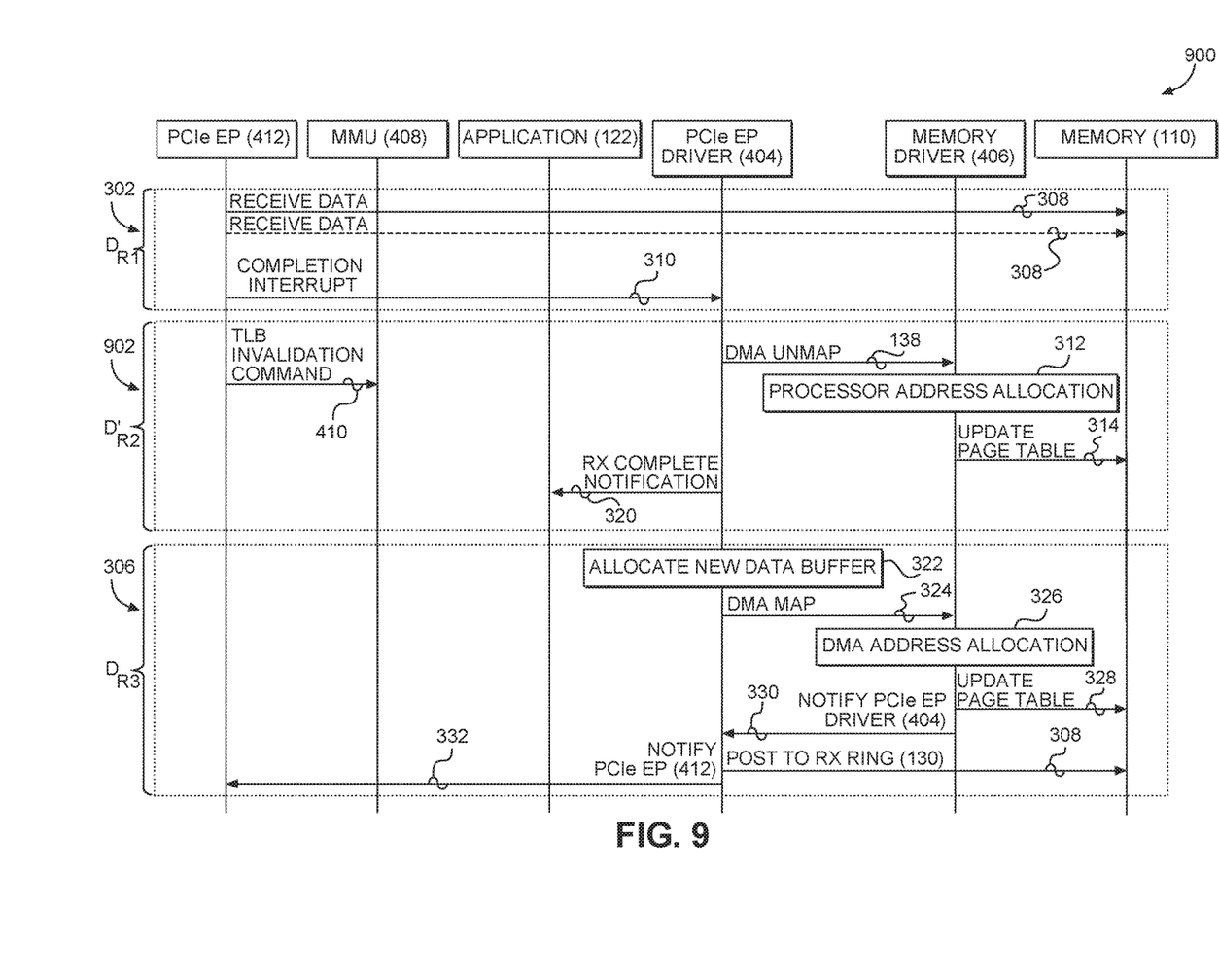
FIG. 9 is an RX operation signal flow diagram providing an exemplary illustration of the hardware-based TLB invalidation mechanism of FIG. 4 performed during a data RX operation.

Further according to previous discussions in FIG. 4, the hardware-based TLB invalidation mechanism performed at the MMU 408 helps to eliminate the TLB invalidation command 140 and the one or more TLB SYNC polling commands 316(1)-316(M) the RX operation signal flow diagram 300 in FIG. 3. In this regard, FIG. 9 is an RX operation signal flow diagram 900 providing an exemplary illustration of the hardware-based TLB invalidation mechanism of FIG. 4 performed during a data RX operation. Common elements between FIGS. 3 and 9 are shown therein with common element numbers and will not be re-described herein.

With reference to FIG. 9, during a TLB invalidation stage 902, the MMU 408 invalidates the TLB 134 in response to receiving the TLB invalidation command 410 from the PCIE EP 412. As such, the TLB invalidation command 140 and the one or more TLB SYNC polling commands 316(1)-316(M) of FIG. 3 can be eliminated. As a result, the TLB invalidation stage 902 corresponds to TLB invalidation duration $D'_{R2}$ that may be reduced relative to the TLB invalidation duration $D_{R2}$ of FIG. 3, thus ensuring that $D'_{R2} \leq D_{Ri}$.

The hardware-based TLB invalidation mechanism of FIG. 4 according to aspects disclosed herein may be provided in or integrated into any processor-based device, such as the host system 400 of FIG. 4. Examples, without limitation, include a set top box, an entertainment unit, a navigation device, a communications device, a fixed location data unit, a mobile location data unit, a mobile phone, a cellular phone, a smart phone, a tablet, a phablet, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, and an automobile.

Figure 10:
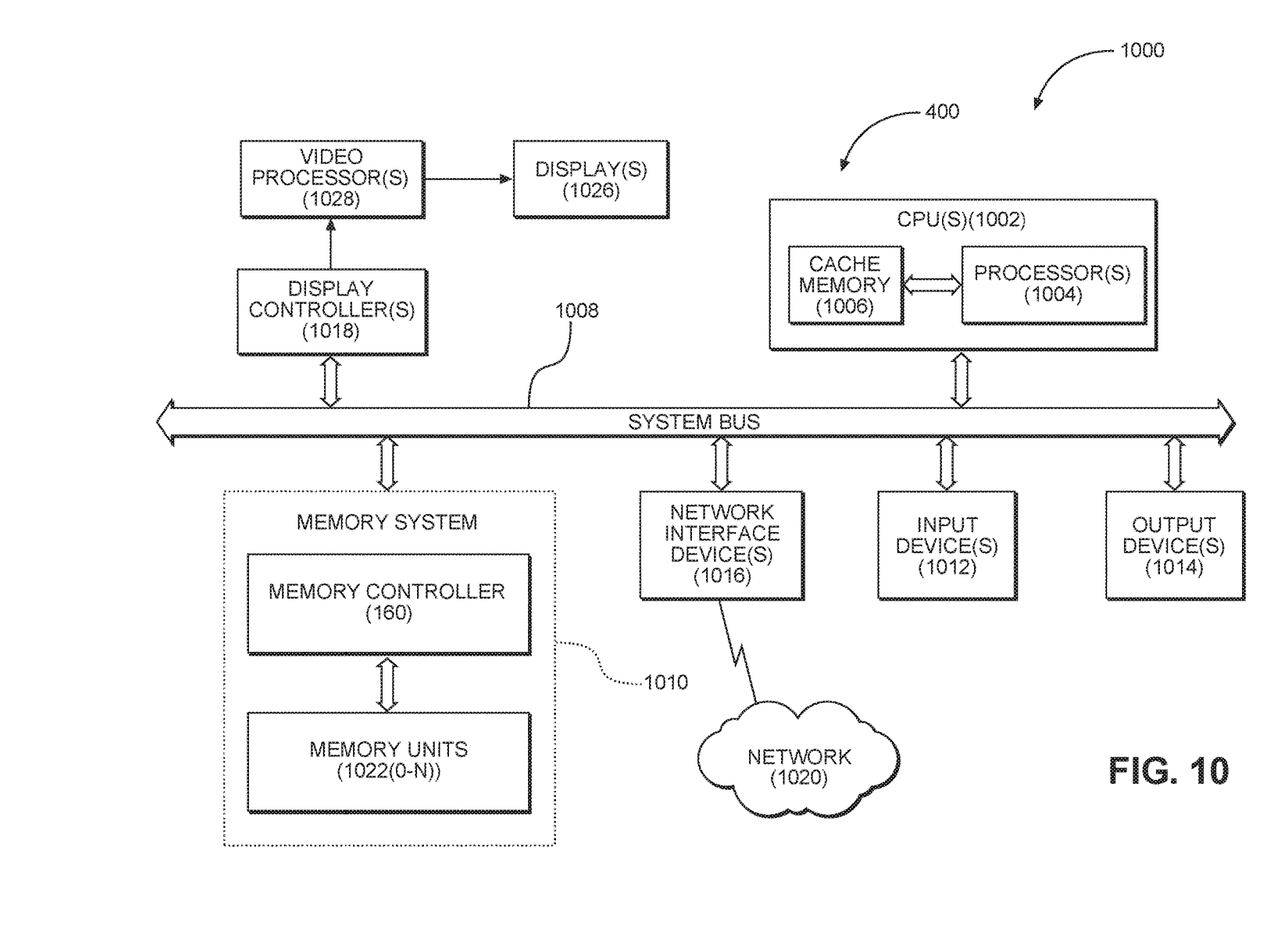
FIG. 10 is a block diagram of an exemplary processor-based system that can include the host system of FIG. 4.

In this regard, FIG. 10 illustrates an example of a processor-based system 1000 that can support the host system 400 of FIG. 4. In this example, the processor-based system 1000 includes one or more central processing units (CPUs) 1002, each including one or more processors 1004. The CPU(s) 1002 may have cache memory 1006 coupled to the processor(s) 1104 for rapid access to temporarily stored data. The CPU(s) 1002 is coupled to a system bus 1008. As is well known, the CPU(s) 1002 communicates with other devices by exchanging address, control, and data information over the system bus 1008. Although not illustrated in FIG. 10, multiple system buses 1008 could be provided, wherein each system bus 1008 constitutes a different fabric.

Other master and slave devices can be connected to the system bus 1008. As illustrated in FIG. 10, these devices can include a memory system 1010, one or more input devices 1012, one or more output devices 1014, one or more network interface devices 1016, and one or more display controllers 1018, as examples. The input device(s) 1012 can include any type of input device, including, but not limited to, input keys, switches, voice processors, etc. The output device(s) 1014 can include any type of output device, including, but not limited to, audio, video, other visual indicators, etc. The network interface device(s) 1016 can be any device configured to allow exchange of data to and from a network 1020. The network 1020 can be any type of network, including, but not limited to, a wired or wireless network, a private or public network, a local area network (LAN), a wireless local area network (WLAN), a wide area network (WAN), a BLUETOOTH™ network, or the Internet. The network interface device(s) 1016 can be configured to support any type of communications protocol desired. The memory system 1010 can include one or more memory units 1022(0-N) and a memory controller 1024.

The CPU(s) 1002 may also be configured to access the display controller(s) 1018 over the system bus 1008 to control information sent to one or more displays 1026. The display controller(s) 1018 sends information to the display(s) 1026 to be displayed via one or more video processors 1028, which process the information to be displayed into a format suitable for the display(s) 1026. The display(s) 1026 can include any type of display, including, but not limited to, a cathode ray tube (CRT), a liquid crystal display (LCD), a plasma display, a light emitting diode (LED) display, etc.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The master devices and slave devices described herein may be employed in any circuit, hardware component, integrated circuit (IC), or IC chip, as examples. Memory disclosed herein may be any type and size of memory and may be configured to store any type of information desired. To illustrate clearly this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A host system, comprising:
   at least one processor coupled to a system bus;
   a memory controller coupled to the system bus and configured to control a memory; and
   a memory management unit (MMU) comprising at least one translation lookaside buffer (TLB), the MMU coupled to the system bus and configured to invalidate the at least one TLB in response to receiving at least one TLB invalidation command from a peripheral component interconnect express (PCIE) endpoint (EP), wherein the PCIE EP is defined in accordance with PCIE base specification revision 3.0.

2. The host system of claim 1 further comprising a PCIE root complex (RC) coupled to the MMU and the PCIE EP, the PCIE RC configured to:
   receive the at least one TLB invalidation command from the PCIE EP; and
   provide the at least one received TLB invalidation command to the MMU;
   wherein the PCIE RC is defined in accordance with PCIE base specification revision 3.0.

3. The host system of claim 1, wherein the at least one TLB invalidation command is received in at least one PCIE transport layer packet (TLP) prefix, wherein the PCIE TLP is defined in accordance with PCIE base specification revision 3.0.

4. The host system of claim 1, wherein the at least one TLB invalidation command is received in at least one PCIE transport layer packet (TLP) header.

5. The host system of claim 1 further comprising the PCIE EP.

6. The host system of claim 1, wherein the PCIE EP is a wireless local area network communication integrated circuit (IC).

7. The host system of claim 1 provided in an integrated circuit (IC).

8. The host system of claim 1 provided in a device selected from the group consisting of: a set top box; an entertainment unit; a navigation device; a communications device; a fixed location data unit; a mobile location data unit; a mobile phone; a cellular phone; a smart phone; a tablet; a phablet; a computer; a portable computer; a desktop computer; a personal digital assistant (PDA); a monitor; a computer monitor; a television; a tuner; a radio; a satellite radio; a music player; a digital music player; a portable music player; a digital video player; a video player; a digital video disc player; a portable digital video player; and an automobile.

9. A method for invalidating at least one translation lookaside buffer (TLB) in a host system, comprising:
   receiving at least one TLB invalidation command from a peripheral component interconnect express (PCIE) endpoint (EP), wherein the PCIE EP is defined in accordance with PCIE base specification revision 3.0; and invalidating the at least one TLB in response to receiving the at least one TLB invalidation command from the PCIE EP.

10. The method of claim 9 comprising receiving the at least one TLB invalidation command by a PCIE root complex (RC) coupled to the PCIE EP, wherein the PCIE RC is defined in accordance with PCIE base specification revision 3.0.

11. The method of claim 9 comprising receiving the at least one TLB invalidation command in at least one PCIE transport layer packet (TLP) prefix, wherein the PCIE TLP is defined in accordance with PCIE base specification revision 3.0.

12. The method of claim 9 comprising receiving the at least one TLB invalidation command in at least one PCIE transport layer packet (TLP) header.

13. A peripheral component interconnect express (PCIE) endpoint (EP) defined in accordance with PCIE base specification revision 3.0, comprising:
   a host interface controller (HIC) communicatively coupled to a host system, wherein the HIC is configured to:
      determine that at least one translation lookaside buffer (TLB) in the host system needs to be invalidated; and
      provide at least one TLB invalidation command to the host system to invalidate the at least one TLB.

14. The PCIE EP of claim 13, wherein the HIC is communicatively coupled to the host system by a PCIE root complex (RC) in the host system, wherein the PCIE RC is defined in accordance with PCIE base specification revision 3.0.

15. The PCIE EP of claim 13, wherein the HIC is configured to provide the at least one TLB invalidation command in at least one PCIE transport layer packet (TLP) prefix, wherein the PCIE TLP is defined in accordance with PCIE base specification revision 3.0.

16. The PCIE EP of claim 13, wherein the HIC is configured to provide the at least one TLB invalidation command in at least one PCIE transport layer packet (TLP) header.

17. The PCIE EP of claim 13 is comprised of a wireless local area network communication integrated circuit (IC).

18. A method for invalidating at least one translation lookaside buffer (TLB) in a host system, comprising:
   communicatively coupling a host interface controller (HIC) in a peripheral component interconnect express (PCIE) endpoint (EP) to a host system;
   determining by the HIC at least one TLB in the host system that needs to be invalidated based on detected data patterns of one or more data blocks; and
   providing at least one TLB invalidation command from the HIC to the host system to invalidate the at least one TLB.

19. The method of claim 18 comprising providing the at least one TLB invalidation command in at least one peripheral component interconnect express (PCIE) transport layer packet (TLP) prefix, wherein the PCIE TLP is defined in accordance with PCIE base specification revision 3.0.

20. The method of claim 18 comprising providing the at least one TLB invalidation command in at least one PCIE transport layer packet (TLP) header.

* * * * *